United States Patent [19]

Yamamoto

[11] Patent Number: 4,517,920
[45] Date of Patent: May 21, 1985

[54] DOMESTIC PETS' CHAMBERPOT

[76] Inventor: Yoshikazu Yamamoto, 1-1, 3-chome, Eganosho, Habikino, Japan

[21] Appl. No.: 567,539

[22] Filed: Jan. 3, 1984

[51] Int. Cl.³ ............................................ A01K 29/00
[52] U.S. Cl. ......................................................... 119/1
[58] Field of Search ............................................. 119/1

[56] References Cited

U.S. PATENT DOCUMENTS

| 2,971,493 | 2/1961 | Robb | 119/1 |
| 3,332,397 | 7/1967 | Vanderwall | 119/1 |
| 3,735,735 | 5/1973 | Noroian | 119/1 |
| 3,793,989 | 2/1974 | Clark | 119/1 |
| 3,990,396 | 11/1976 | Turk | 119/1 |
| 4,095,559 | 6/1978 | Griffith | 119/1 |
| 4,444,148 | 4/1984 | Lander | 119/1 |

Primary Examiner—Robert P. Swiatek
Assistant Examiner—Kris R. Schulze
Attorney, Agent, or Firm—Moonray Kojima

[57] ABSTRACT

This invention is concerned with a chamberpot which is used for disposal of excrement from domestic pets such as cats, dogs and the like that are daily kept in the inside of rooms or of a house, which chamberpot being provided with a filling member wherein particular materials are contained that can cover an offensive odor of pets' excrement or mix aromatic compounds with the odor to overwhelm the same, or that can emit such a smell as incites pets to excrete into the chamberpot. The invention further involves a scoop to enable pet-keepers to dispose of their pets' excrement from the chamberpot without getting their hands dirty by directly touching the excrement.

5 Claims, 6 Drawing Figures

DOMESTIC PETS' CHAMBERPOT

DESCRIPTION OF THE PRIOR ART

Most of the conventional domestic pet chamberpots in general use are composed of a lower frame member having a vertical peripheral wall and of an upper frame member having its bottom formed into a mesh netting form with sand contained in the inside thereof. The disadvantages with these arrangements are, however, that they are not provided with means for covering an offensive odor of pets' excrement or emitting aromatic smell so as to destroy the odor, and that they are used in the inside of rooms or of a house, resulting in a bad smell being caused in a short length of time even if the excrement is cleaned out. Consequently pet-keepers and their family are always exposed to the malodor from their pets' excrement that is filled in the room or every nook and corner of the house.

In order to resolve the above-mentioned troubles there have been proposed pet chamberpots that are provided with either a deoderant or an aromatic between an upper frame surface and a lower frame surface, respectively, of a main lower frame portion of the chamberpot. A filler such as sand is placed in the inside of the upper frame surface so that bad smell caused on the surface of the sand cannot be deodorized nor aromatically overwhelmed.

Furthermore, the above-mentioned pets' chamberpots are not provided with means for mounting a scoop for disposing of excrement from domestic pets so that they are compelled to dispose of the excrement directly by their own hands when driven by necessity.

OBJECTS OF THE INVENTION

Accordingly, the present invention has been made to eliminate the above-mentioned drawbacks and disadvantages of the conventional domestic pets' chamberpots, having as one of its main objects a provision of pets' chamberpot having a construction which is provided with an upper frame that has a peripheral inside formed into a spatial room for filling therein both or either of a deoderizer and an aromatic. On an upper portion of said peripheral inside there is provided a vent intercommunicated with the space or spatial room whereby a bad smell caused on the surface of the sand can be deodorized by the deoderizer and destroyed by the aromatic. The deoderizer and the aromatic may be superseded with an inciting agent that incites domestic pets to excrete into the spatial room whereby pets will be incited to excrete into a fixed chamberpot by themselves, resulting in the pet-keepers being able to save time in training their pets to do so.

Another object of the invention is to provide a domestic pets' chamberpot that has an outer wall of main upper frame portion provided with an opening and closing lid for permitting a deoderizer, an aromatic and an inciting agent to be easily put therethrough.

Another object of the invention is to provide a domestic pets' chamberpot wherein a main upper frame portion has its upper peripheral wall bored with a hole for inserting therethrough a scoop adapted to be usable for disposing of excrement of domestic pets whereby the scoop can be normally held in position of the chamberpot, ready to be used for disposal of pets' excrement whenever necessities occasion, without getting pet-keepers' hands dirty by directly touching the excrement. Moreover, the domestic pets' chamberpot of the present invention may be moved to a selected position of a room without losing the scoop since the latter is held in a fixed and visually accessible position of the chamberpot whereby the pet-keepers are able not only to use the scoop to remove pets' excrement but also level sand and heap the same up as desired, with the result of enhancing the function of the pets' chamberpot.

A further object of the invention is to provide a domestic pets' chamberpot which is formed into a square shape having an arc bent portion, a corner of which being bored with a hole for inserting a scoop thereinto so as to keep the scoop along the bent portion thereof, thus positioning the scoop out of the way.

A still further object of the invention is to provide a domestic pets' chamberpot comprising both an upper frame portion and a lower frame portion made of synthetic resin material which makes it easy to manufacture the chamberpot itself, having an upper peripheral wall provided with a guard projecting in internally inclined relation whereby sand or other filling material can be prevented from being scattered outwards when pets scratch, as are habitual, the sand or other filling material after they have excreted.

BRIEF DESCRIPTION OF ACCOMPANYING DRAWINGS

DETAILED DESCRIPTION OF THE INVENTION

Figure 1:
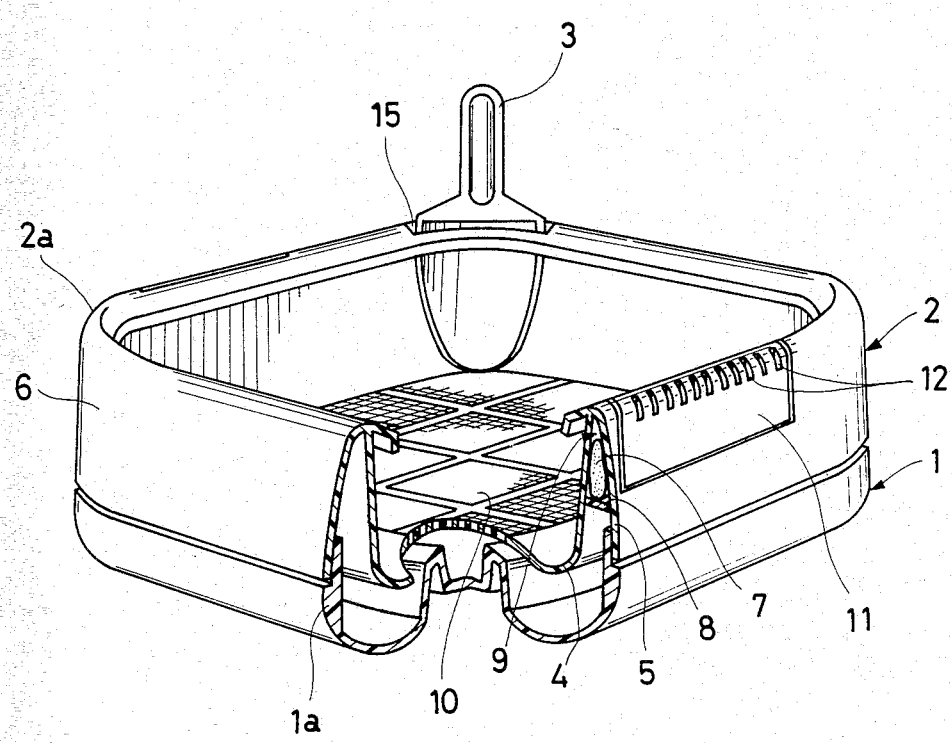
FIG. 1 is a partially cut-away perspective view showing a domestic pets' chamberpot carried out in accordance with the present invention.

Now setting forth in detail a few preferred embodiments of the present invention in conjunction with the accompanying drawings wherein the domestic pets' chamberpot of the invention comprises a dish shaped lower frame member 1 made of synthetic resin material and provided with an erect or upward extending wall 1a in the outer peripheral portion thereof and an upper frame member 2 likewise made of synthetic resin material and insertibly fixed to erected wall 1a. The lower frame member 1 and upper frame member 2 are both formed into a square shape with respect to its top plan view and provided with an arc bent portion, along one corner of which there is erected a scoop 3.

The upper frame member 2 is provided in the outer peripheral portion thereof with a peripheral wall 6 comprising an inner wall 4 and an outer wall 5. Between these walls 4 and 5 there is formed a space or spatial room 9 which is partitioned by means of a mounting plate 8 so as to receive a particular material 7 such as a deoderizer, an aromatic or an inciting agent.

The upper frame member 2 has its inner bottom provided with a mesh netting 10 in either intercommunicated or integral relation with peripheral wall 6.

Figure 2:
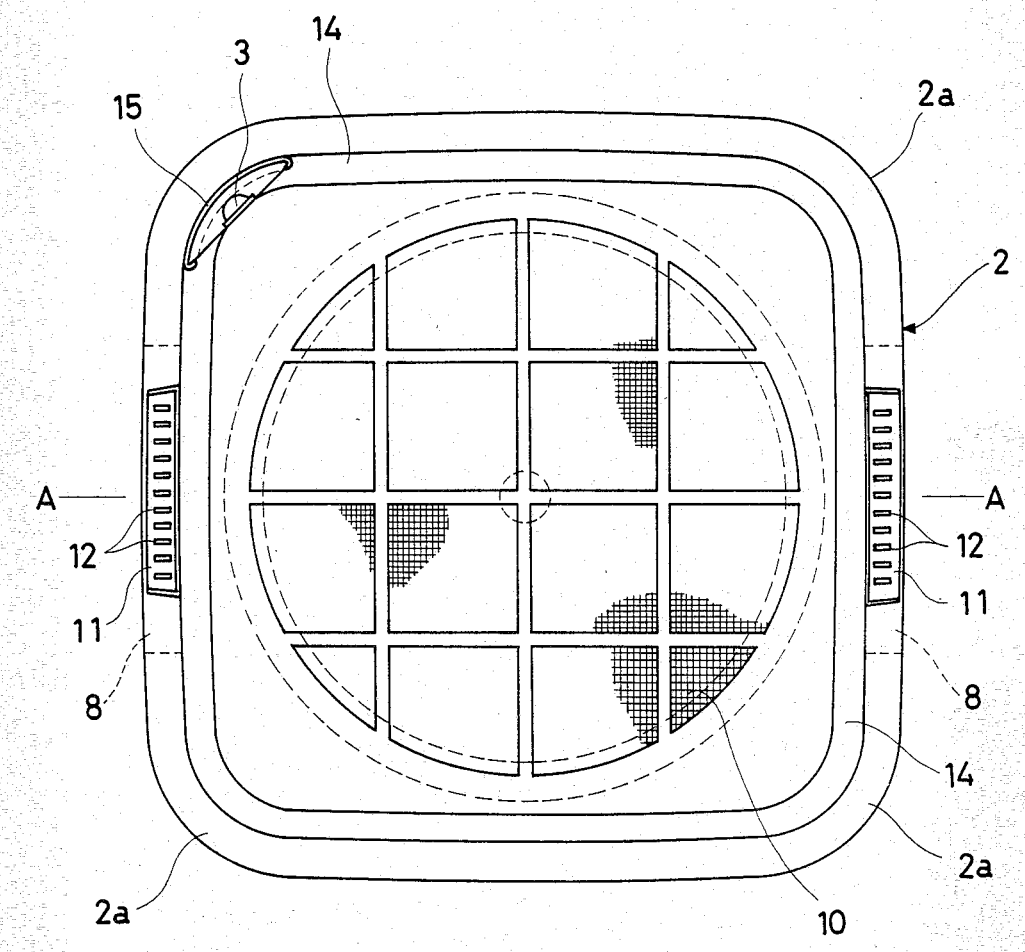
FIG. 2 is a top plan view thereof.
Figure 3:
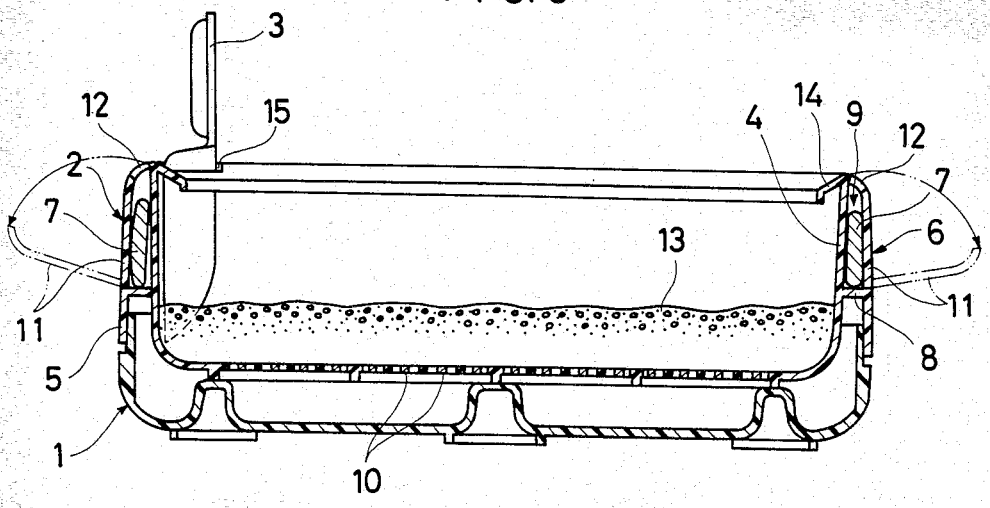
FIG. 3 is a vertical cross-sectioned elevation taken along the line A—A of FIG. 2.

On each of opposed upper portions of outer wall 5 there is mounted an opening and closing lid 11 formed by partially cutting wall 5 thereby to receive particular materials 7 in spatial room 9. The upper portion of lid 11 is provided with a plurality of vents 12 lined latitudinally thereof. The upper portion of peripheral wall 6 has a guard 14 (FIG. 2) projected inwardly aslant in integral relation therewith whereby an inner filler 13 such as sand can be prevented from scattering outwardly.

A corner of guard 14 has its portion bored with a slit 15 which permits the scoop 3 to be inserted in an upright state. The slit 15 is provided on an arc bent portion 2a of upper frame member 2 so as to receive the scoop 3 in conformity with the curvature thereof.

According to the above-mentioned construction of the domestic pets' chamberpot in accordance with the present embodiment of the invention, there is put inner filler 13 such as sand in the inside of the upper frame member 2 and then either a deodorizer or an aromatic or an inciting agent is placed in spatial room 9 after opening lid 11.

In case a deoderizer is in spatial room 9, malodor from pets' excrement is absorbed through the vents 12 of said peripheral wall 6. In case an aromatic is placed in the space 9, the aromatic ejects its fragrant smell outwardly through the vents 12, thus destroying the malodor of the excrement. Further in case an inciting agent is placed in the spatial room 9, the agent ejects a bad smell that incites pets to excrete so as to help the pets learn excreting in the inside of a fixed pets' chamberpot.

Figure 6:
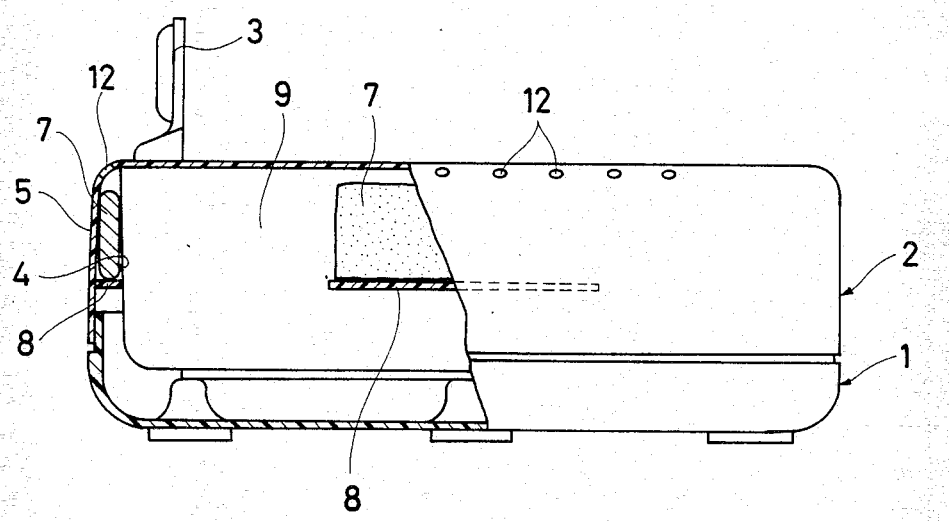
FIG. 6 is a partially cut-away perspective view showing still another embodiment of the invention.
Figure 4:
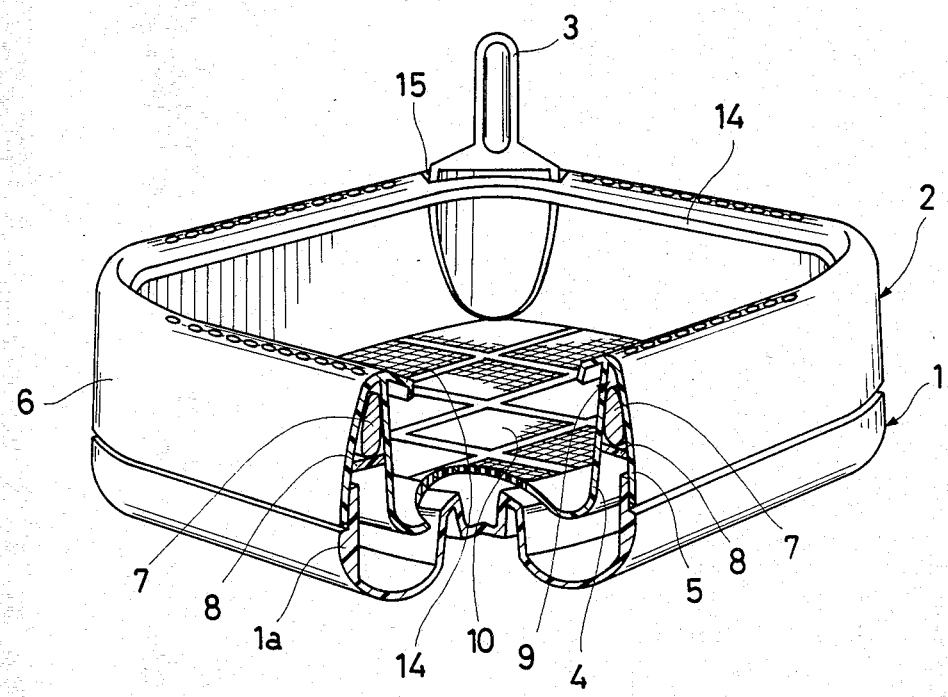
FIG. 4 is a partially cut-away perspective view showing another embodiment of the invention.
Figure 5:
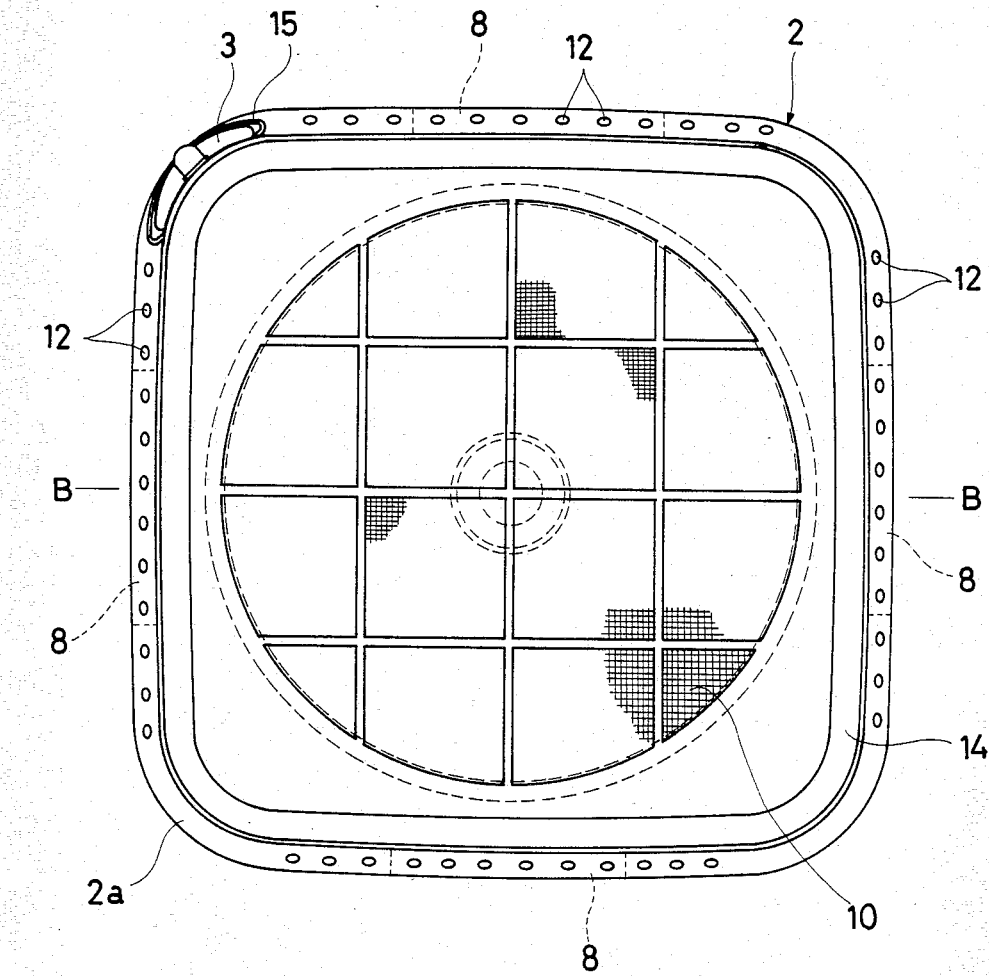
FIG. 5 is a top plan view of a further embodiment of the invention.

When it is necessary to remove excrement accumulated in the inside of the chamberpot, pet keepers may take off the scoop 3 which is held in a corner 15 of the chamberpot and scoop the excrement by using scoop 3, thus enabling them to clear the chamberpot without getting their hands dirty. In FIGS. 4 thru 6 there are shown other embodiments of the invention wherein domestic pets' chamberpot comprises a lower frame member 1 and an upper frame member 2. Between the inner walls 4 and 5 of the peripheral wall 6 of upper frame member 2 there is formed a space or spatial room 9 for receiving particular materials 7 such as a deodorizer, an aromatic or an inciting agent. The plurality of vents 12 are provided directly on the upper portion of the peripheral wall 6 while the mounting plate 8 in the lower portion of said spatial room 9 is mounted in the intermediate portion of the upper frame member 2 with respect to the width thereof, with the both sides thereof being intercommunicated downwardly so as to provide a space or spatial room for putting particular materials 7 in and out therethrough. Thus according to the present embodiment of the invention, particular materials 7 are put in and taken out through spatial room 9 by separating the two frame members 1 and 2 from one another and then carrying out the putting-in and taking-off operation with mounting plate 8 removed from between both sides of the upper frame member 2.

It should be noted that the present invention, illustrated and described in detail in the drawings and foregoing description, is to be considered as illustrative and restrictive in character, and that all changes and modifications that come within the spirit of the present invention are included.

What is claimed is:

1. A chamberpot for domestic pets, comprising
    a lower frame member having a lower portion and extending upwardly therefrom an erect wall; and
    an upper frame member comprising
        an outer wall formed along a periphery thereof and insertably fixed on said erect wall of said lower frame member,
        an inner wall connected to said outer wall and forming a space therebetween for placement of a deodorizer, an aromatic or an inciting agent,
        a bottom portion formed substantially normal to said inner wall and connecting the inner wall and further having a mesh netting shape, and
        venting means disposed toward the connecting part of said inner wall and said outer wall and accessible to said space for venting said deodorizer, aromatic or inciting agent.

2. The chamberpot of claim 1, wherein said venting means comprises a movable lid for closing and opening said space for placement of said deodorizer, aromatic or inciting agent therethrough.

3. The chamberpot of claim 1, wherein said outer wall comprises an inwardly directed lip having a hole for holding a scoop.

4. The chamberpot of claim 1, wherein said upper frame and lower frame are substantially square in shape with arc portions located at the corners thereof; and wherein a corner is used to hold a scoop.

5. The chamberpot of claim 1, wherein said upper frame and said lower frame are made of synthetic resin, and wherein said outer wall of said upper frame has an inwardly directed lip for preventing material contained in said bottom from escaping.

* * * * *